United States Patent [19]

Farr

[11] Patent Number: 5,537,834
[45] Date of Patent: Jul. 23, 1996

[54] INDUCTIVELY ACTIVATED CONTROL AND PROTECTION CIRCUIT FOR REFRIGERATION SYSTEMS

[75] Inventor: James B. Farr, Ann Arbor, Mich.

[73] Assignee: Tecumseh Products Company, Tecumseh, Mich.

[21] Appl. No.: 397,384

[22] Filed: Mar. 2, 1995

Related U.S. Application Data

[62] Division of Ser. No. 131,420, Oct. 4, 1993.

[51] Int. Cl.$^6$ .................................. F25B 49/02
[52] U.S. Cl. .................. 62/126; 62/158; 62/161; 62/180
[58] Field of Search .................... 62/126, 127, 129, 62/180, 157, 158, 231, 161, 163, 186, 164

[56] References Cited

U.S. PATENT DOCUMENTS

| | | | |
|---|---|---|---|
| 3,095,531 | 6/1963 | Leland | 318/221 |
| 3,324,352 | 6/1967 | Hover | 317/13 |
| 3,585,451 | 6/1971 | Day | 317/13 |
| 3,660,718 | 5/1972 | Pinckaers | 317/13 |
| 3,665,273 | 5/1972 | Enslin | 318/227 |
| 3,700,988 | 10/1972 | Pryjmak | 318/227 |
| 3,721,866 | 3/1973 | Mcintosh | 317/141 |
| 3,809,985 | 5/1974 | Krause et al. | 318/490 |
| 3,908,158 | 9/1975 | Studtmann | 318/227 |
| 3,946,574 | 3/1976 | Portera | 62/158 |
| 4,028,736 | 6/1977 | Willson et al. | 361/29 |
| 4,042,966 | 8/1977 | Newell | 361/27 |
| 4,075,864 | 2/1978 | Schrader | 62/180 |
| 4,196,462 | 4/1980 | Pohl | 361/33 |
| 4,225,777 | 9/1980 | Schindler | 219/497 |
| 4,253,130 | 2/1981 | Newell | 361/22 |
| 4,265,603 | 5/1981 | Chiyoda | 418/2 |
| 4,281,358 | 7/1981 | Plouffe et al. | 361/22 |
| 4,399,394 | 8/1983 | Ballman | 318/786 |
| 4,510,547 | 4/1985 | Rudich, Jr. | 361/22 |
| 4,722,019 | 1/1988 | Pohl | 361/22 |
| 4,724,678 | 2/1988 | Pohl | 62/140 X |
| 4,831,313 | 5/1989 | Beilfuss | 388/822 |
| 4,912,936 | 4/1990 | Denpou | 62/158 |
| 4,968,338 | 11/1990 | Sugiyama | 62/126 |

FOREIGN PATENT DOCUMENTS

| | | |
|---|---|---|
| 0551053A1 | 12/1992 | France . |
| 4023749A1 | 5/1991 | Germany . |
| 2067858A | 7/1981 | United Kingdom . |

OTHER PUBLICATIONS

European Search Report Dated Dec. 23, 1994.

*Primary Examiner*—Harry B. Tanner
*Attorney, Agent, or Firm*—Baker & Daniels

[57] ABSTRACT

The present invention involves an inductively activated silicon switch for a control and protection circuit for motors and compressors. The circuit includes a logic gate for combining both motor control and protection functions. The logic gate has inputs from a thermostat, a compressor shell temperature circuit, a fan overheat detection circuit, a motor start relay circuit, and motor load sensing circuits. The logic gate output is connected to an oscillator for inductively activating the power output stage, as well as a start relay, a compressor shell temperature hysteresis circuit, and a fan timer circuit connected to the fan control circuit. The control circuitry further includes an over-ride circuit for manually allowing a limited number of immediate restart attempts.

14 Claims, 5 Drawing Sheets

INDUCTIVELY ACTIVATED CONTROL AND PROTECTION CIRCUIT FOR REFRIGERATION SYSTEMS

This is a division of application Ser. No. 08/131,420, filed Oct. 4, 1993.

BACKGROUND OF THE INVENTION

1. Field of the Invention

The present invention relates to control and protection circuitry for refrigeration systems. More particularly, the field of the invention involves circuitry for activating and deactivating a compressor and a fan motor.

2. Description of the Related Art

Motor protection devices generally include electro-mechanical or solid state electronic devices for protection and control of motors or compressors. Conventional motor protection devices seek to regulate the current drawn by the compressor motor under various loads and conditions. By limiting the amount of current provided to the compressor motor, conventional motor protection devices protect the compressor's windings from damaging effects of high currents and high temperatures.

For example, one conventional motor protection device is a snap disc placed in series with the windings of the compressor motor. The snap disc is composed of bi-metallic layers which are in physical contact with the contact points which close the circuit. Typically, a resistive heating element which heats the bi-metallic layers is connected in series with contact points such that when the heat generated by compressor current passing through the resistive element exceeds the allowable threshold, the different metals of the bi-metallic layer expand at different rates, causing the disc to bend. This bending of the disc breaks the connection to the contact points, thereby opening the circuit to the compressor motor. Another arrangement involves placing the snap disc device in close proximity to the compressor motor so that the snap disc device may open and close in response to the temperature of the compressor motor.

Several problems may occur with a conventional snap action bi-metallic motor overload protector. One problem with the snap disc device is that the overload condition may be detected only after a significant amount of time has passed since the condition originally developed. During this lag time, significant damage to the windings of the motor can occur. Also, conventional snap disc overload protection devices are generally imprecise and non-dynamic. For instance, the temperature and current set points of a snap disc cannot account for different environmental or motor loading conditions. Finally, once the snap disc has opened the circuit to the motor windings, the restoration period of the bi-metallic device is typically excessively lengthy.

Additional motor protection devices include solid state electronic devices which control the power delivered to the compressor motor. In contrast with the electro-mechanical snap disc devices, solid state protection devices have the advantages of precision, reliability, and self-regulation. Generally, a conventional electronic protection device includes a thermostat to sense ambient and internal compressor temperatures, control logic responsive to inputs and which controls the corresponding outputs, and solid state power components which are used to apply power to the compressor motor. For instance, thermostats using thermistors as temperature sensing inputs to an electronic motor control circuit are disclosed in U.S. Pat. No. 5,231,848, "REFRIGERATOR COLD CONTROL", issued Aug. 3, 1993, which is assigned to the assignee of the present invention, the disclosures of which are explicitly incorporated by reference.

Prior art motor protection devices typically include power output stages which regulate the application of power to the compressor motor. The output of the control logic circuit drives the output power stage, either by direct electrical connection to the output stage or by indirect magnetic coupling through a relay. Both techniques offer significant advantages in accuracy, reliability, and precision over electro-mechanical methods for controlling and protecting compressor motors.

However, circuits which directly couple the control logic circuit to the power output stage suffer from problems associated with noise induced into the control logic circuit from the high current flow of the power output stage. In order to eliminate such problems, conventional solid state control circuits utilize a relay to control the activation gate of a solid state switch element, such as a SCR or TRIAC. While the use of a relay offers the benefit of electrical isolation of the control logic circuit and the power output circuit, the use of relays in compressor motor protector circuits may also be problematic. For instance, under high temperature conditions the metallic contacts of the relay may melt down and permanently close due to excessive compressor temperatures. Furthermore, the physical contacts within the relay are subject to damage from repeated wear, corrosion, metal fatigue, or other physically degrading conditions.

What is needed is a compressor motor protection device which is not as subject to noise problems or physical degradation as conventional motor protection devices.

Also needed is a motor protection device which is more accurate and precise than conventional electro-mechanical protection devices.

SUMMARY OF THE INVENTION

The present invention combines the control and motor protection functions into a circuit which inductively activates a solid state switch which gates electrical current to the compressor motor. The circuitry of the present invention provides precise control of the compressor motor while electrically isolating the power switching from the more sensitive control and sensing circuitry. Also, the present invention combines the compressor and fan control functions, allowing for more efficient system control by coordinating the operation of the compressor and fan.

The circuitry of the present invention provides many performance features in an efficient and economical arrangement. For example, the relatively quick response of the circuitry limits the duration of a locked rotor condition versus conventional circuitry using snap discs or relays. Also, the circuitry checks against low line voltage or low temperature ambient, and disables the compressor motor in the event of such a condition. Also, by selecting appropriately sized electrical components, the control circuitry provides a selectable temperature hysteresis.

Upon start-up, the circuitry of the present invention includes a start relay for decreasing the equivalent impedance of the run capacitor during motor start-up. Also, an optional start-up delay avoidance circuit is provided to allow, for a limited number of tries, a manual over-ride of the locked rotor protection circuitry. However, the circuit prevents an excessive number of such over-ride attempts.

The present invention, in one form, is a refrigeration system for cooling a chamber, a compressor having a motor adapted for connection to a power supply, and a control circuit for controlling the activation of the compressor motor. The circuit includes a solid state switch for electrically coupling the power supply and the compressor motor. The solid state switch includes an activation gate which opens and closes current flow through the solid state switch. The system further includes an inductive coupling for inducing a current on the activation gate of the solid state switch to actuate the activation gate and thereby provide power to the compressor motor.

The refrigeration system further includes an oscillation device operatively associated with the inductive coupling for driving the solid state switch, and a device for sensing the operating condition of the compressor motor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
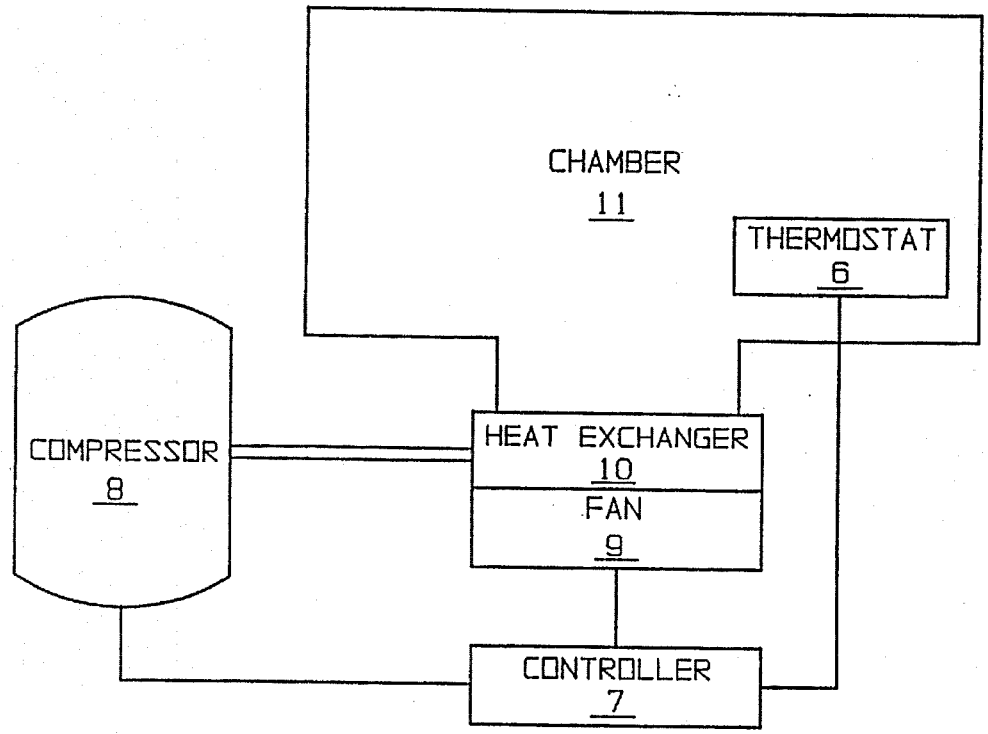
FIG. 1 is a schematic diagram of the components of the refrigeration system of the present invention.

corresponding reference characters indicate corresponding parts throughout the several views. The exemplification set out herein illustrates preferred embodiments of the invention, in several forms, and such exemplifications are not to be construed as limiting the scope of the invention in any manner.

DESCRIPTION OF THE PREFERRED EMBODIMENT

The preferred embodiments disclosed below are not intended to be exhaustive or limit the invention to the precise forms disclosed in the following detailed description. Rather, the embodiments are chosen and described so that others skilled in the art may utilize their teachings.

The present invention relates generally to compressor motor controllers for refrigeration systems shown in FIG. 1. Controller 7 is electrically connected to thermostat 6, compressor 8, and fan 9. Thermostat 6 is located within chamber 11 to detect the temperature within the chamber, and provide appropriate information to controller 7. Controller 7 activates and deactivates compressor 8 and fan 9 in order to control the temperature in chamber 11.

Figure 2A:
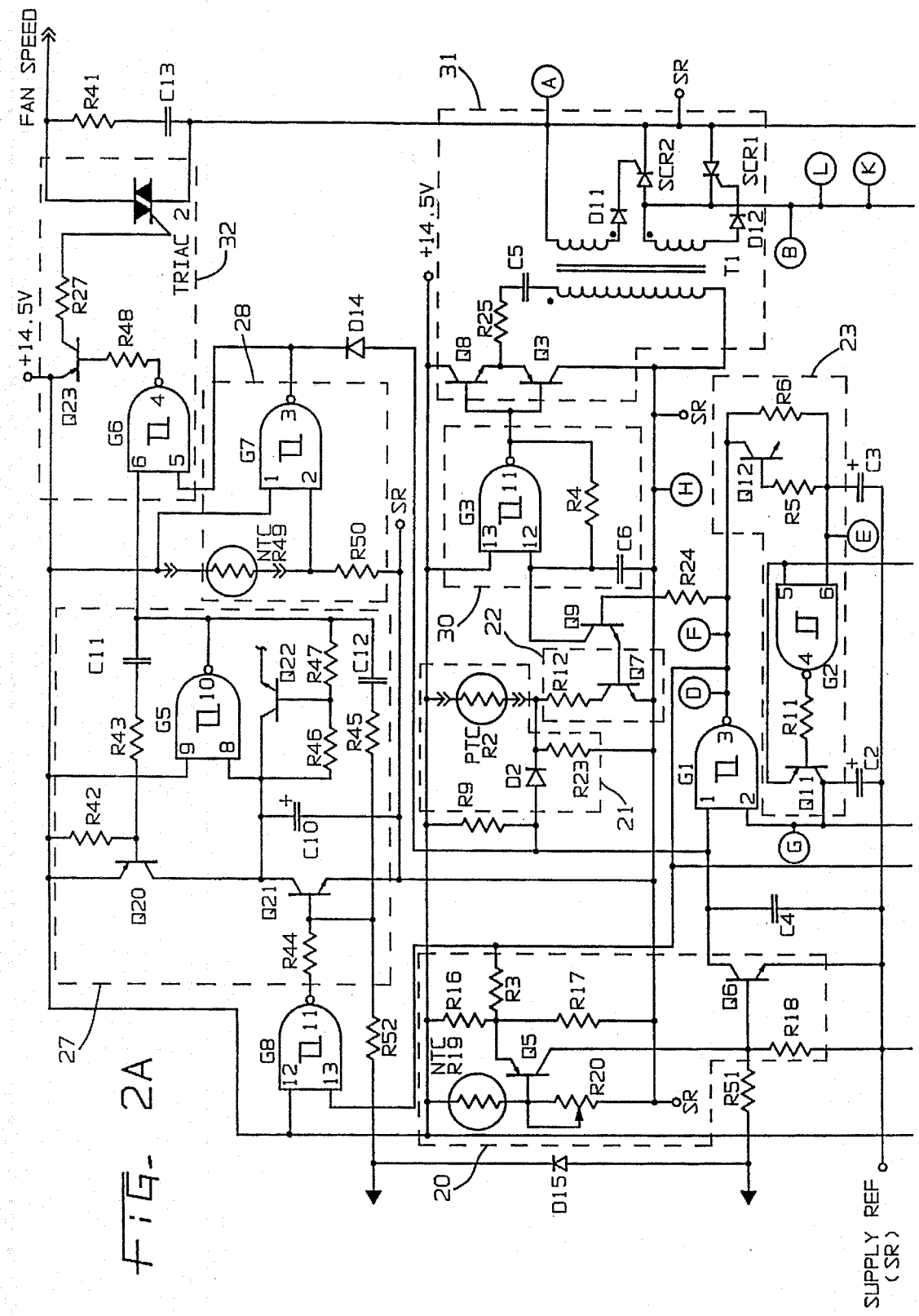
FIGS. 2A and 2B form a schematic circuit diagram of the compressor motor protection circuit of the present invention.
Figure 2B:
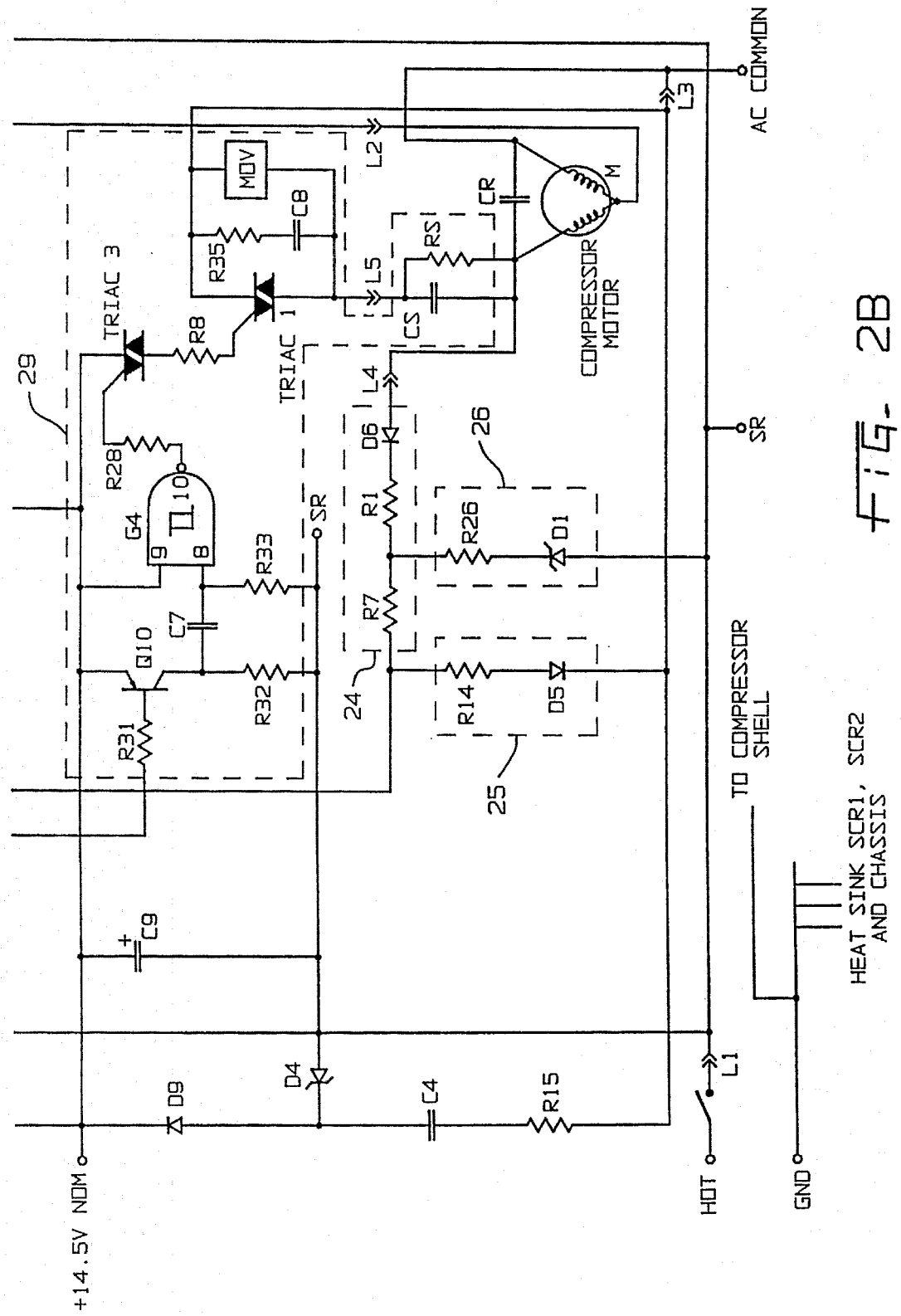

FIGS. 2A and 2B show a schematic circuit diagram of controller 7 including thermostat 6. The circuit includes NAND gate G1 for combining both motor control and protection functions, which has inputs from thermostat 20, compressor shell temperature circuit 21, fan overheat detection circuit 28, over-ride circuit 23, and motor load sensing circuits 24, 25, and 26. The system outputs, connected to output pin 3 of NAND gate G1, include oscillator 30 connected to power output stage 31, motor start relay 29 connected to TRAIC3 and TRIAC1, compressor shell temperature hysteresis circuit 22, and fan controller 27 which is connected to fan activation circuit 32.

NAND gate G1 accepts inputs from the system's sensors, and controls the compressor motor through resistor R24 and transistor Q9. Pull-up resistor R9 maintains input pin 1 of NAND gate G1 at a high voltage level unless an open-collector device or other input device pulls the voltage at pin 1 low.

Solid state power control to compressor motor M is governed by NAND gate G1, transistor Q9, oscillator 30, and power output stage 31. Power output stage 31 utilizes solid state switches, such as SCR1 and SCR2, or alternatively TRIAC4 shown in FIG. 5, to perform solid state power switching to compressor motor M.

Under normal conditions, oscillator 30, composed of NAND gate G3, feedback resistor R4, and charging capacitor C6, generates high frequency oscillations of a period proportional to the RC time constant which is the product of the values of resistor R4 and capacitor C6. The output waveform produced by oscillator 30 feeds power output stage 31.

Transistors Q8 and Q3, resistor R25, and capacitor C5 form a complementary push-pull amplifier which is connected to the primary side of transformer T1. The push-pull amplifier is used to conduct the signal produced by oscillator 30 during both positive and negative cycles of oscillation.

The secondary side of power output stage 31 is composed of transformer T1, diodes D11 and D12, and reverse blocking triode thyristors SCR1 and SCR2. The high frequency periodic pulses appearing on the primary side of transformer T1 control the gate voltages applied to SCR1 and SCR2 on the secondary side of transformer T1. SCR1 and SCR2, in inverse-parallel arrangement, control the application of power to compressor motor M. Specifically, when diode D11 is forward biased, current travels into the gate of SCR2, thereby activating SCR2 for conduction. Likewise, when diode D12 is forward biased, current travels into the gate of SCR1, thereby activating SCR1 for conduction. Since the frequency of the oscillations produced by oscillator 30 are much higher than the 60 hz line frequency, the inverse-parallel arrangement of SCR1 and SCR2 delivers AC power to compressor motor M utilizing the positive or negative cycles of the AC line voltage, as long as oscillator 30 is running.

Figure 5:
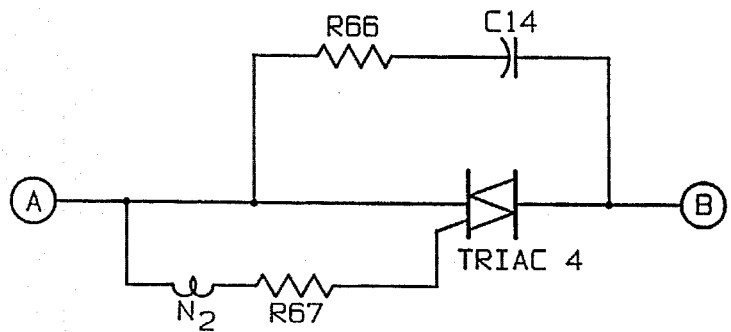
FIG. 5 is a schematic circuit diagram of a second embodiment of a solid state power control circuit.

The circuit diagram of FIG. 5 shows a second embodiment of power output stage 31. Referring to FIG. 5, secondary winding N2 provides the gate voltage to TRIAC4 through resistor R67. In this configuration, TRIAC4 is used in place of SCR1, SCR2, and diodes D11 and D12. The use of solid state switches such as thyristors, either SCR's or a TRIAC, for controlling the provision of electrical power to compressor motor M ensures that compressor motor M is turned off at the next zero crossing of motor current. With prior art snap discs, motor current is typically interrupted at a point of relatively high current, thereby generating high voltage in the motor windings.

Deactivation of compressor motor M is achieved by stopping the oscillation of oscillator 30. While oscillator 30 begins running when power is applied to the circuit, transistor Q9 controls the subsequent operation of oscillator 30.

When the base voltage of Q9 through resistor R24 is low, transistor Q9 turns off, and oscillator 30 drives power output stage 31 thereby activating compressor motor M. When the base voltage of transistor Q9 is high, Q9 conducts from collector to emitter, holding the voltage of input pin 12 of NAND gate 3 low, thereby suspending oscillator 30, which deactivates compressor motor M.

In order to monitor the operation of compressor motor M, voltage sensing and current sensing techniques are employed by the present invention. Voltage sensing is a technique used to determine the present load on compressor motor M. When compressor motor M is in a running state, as the compressor load increases, the voltage across the auxiliary winding decreases. Input pin 2 of NAND gate G1 is connected to voltage reference branch 25, voltage sensing branch 24, and over-ride circuit 23 in order to sense the operating condition of compressor motor M.

Voltage sensing branch 24 includes resistors R7 and R1, and diode D6 which are connected to the auxiliary winding of compressor motor M. Compensating network 26 includes resistor R26 connected to the cathode of zener diode D1. The anode of zener diode D1 is connected to DC ground, referred to as supply reference (SR). Reference branch 25 is composed of resistor R14 and diode D5, whose cathode is connected to AC common.

Sensing branch 24, in conjunction with reference branch 25 and compensating network 26, senses the voltage level across the auxiliary winding of compressor motor M. Under light loading conditions, the voltage across the auxiliary winding of compressor motor M is large, therefore the voltage at input pin 2 of NAND gate G1 is high. However, as the load on compressor motor M increases, the voltage across the auxiliary winding decreases. When this winding voltage declines sufficiently, the voltage @pin 2 reaches the negative threshold of input pin 2, causing the output of NAND gate G1 to jump to a high state, thereby inhibiting oscillator 30, which deactivates compressor motor M through power output stage 31. In this manner, compressor motor M is deactivated when the motor load exceeds allowable limits. NAND gate G2 operates with capacitor C3 and resistor R6 to provide a motor off cycle timer, which latches gate G1 off for about 47 seconds after compressor motor M is deactivated because of excessive motor load.

Figure 4:
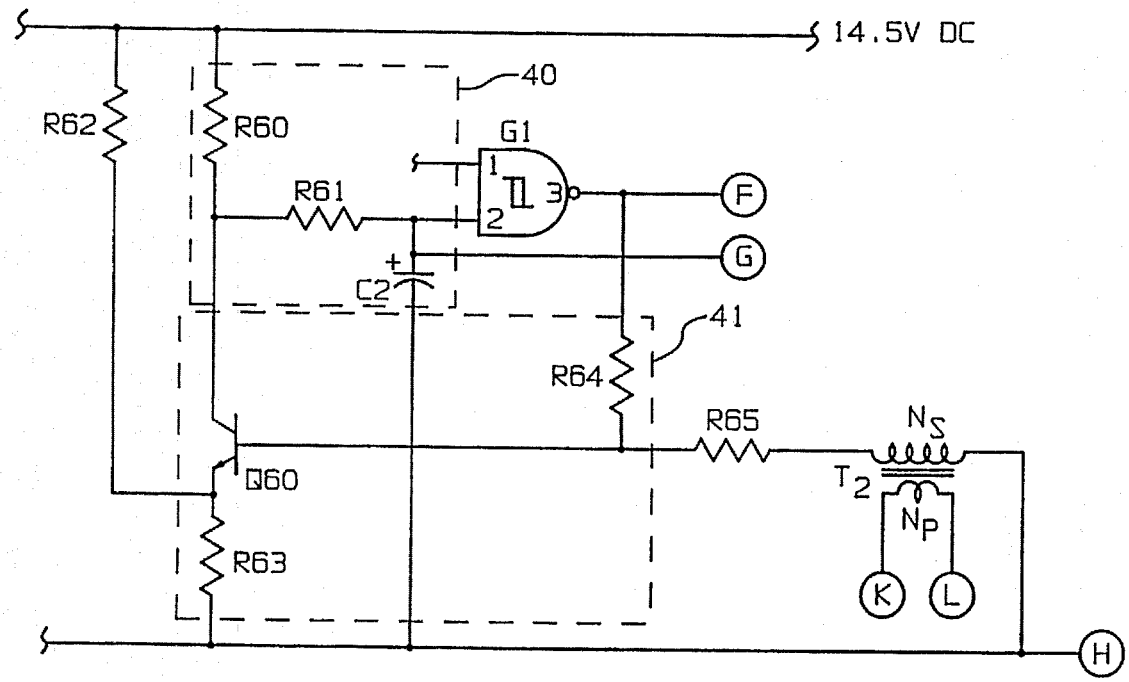
FIG. 4 is a schematic circuit diagram of a portion of a second embodiment of a compressor motor protection circuit.

FIG. 4 shows a schematic diagram of a second embodiment of the solid state motor control. This circuit configuration implements current sensing techniques to determine motor loading. Referring to FIG. 4, transformer T2 has primary winding $N_p$ connected in series with compressor motor M. The changing load current traveling through the primary winding of transformer T2 induces a corresponding voltage across the secondary winding, $N_s$, of transformer T2. This changing secondary voltage feeds the base of transistor Q60 through resistor R65. As the load current increases, the base voltage of transistor Q60 also increases relative to the DC supply ground. When the load current has reached the maximum allowable level, transistor Q60 is pulsed on and conducts current through resistor R60 such that the voltage at input pin 2 to NAND gate G1 is pulled low, thereby setting the output voltage of NAND gate G1 high. As a result, oscillator 30 is suspended from driving power output stage 31, thereby deactivating motor M. Once output pin 3 of gate G1 has jumped to a high state, it is necessary to latch input pin 2 in a low state until the motor protector timer, which comprises transistor Q12, capacitor C3, resistors $R_5$, $R_6$ and gate G2, produces an over-ride pulse at pin 2. This latch function is formed by resistor R64 and transistor Q60. Thus, transistor Q60 performs dual functions of current sensing and off-cycle latching.

Following the deactivation of compressor motor M, the motor protector produces an over-ride pulse to charge capacitor C2 to a voltage exceeding the positive threshold of G1 at input pin 2. If motor load current then remains below the trip level as determined by the voltage generated in winding $N_s$ of transformer T2, and by the threshold circuitry consisting of transistor Q60, resistors R65, R62, and R63, compressor motor M continues to be energized. Resistors R62 and R63 form a voltage reference at the emitter of Q60 relative to the DC power supply ground.

In addition to sensing the load conditions of compressor motor M, other inputs to the motor protection system provide additional sensing for control of compressor motor M and fan 9.

Thermostat 20 is composed of negative temperature coefficient NTC thermistor R19, potentiometer R20, PNP transistor Q5, and resistors R16, R17, R3. NTC thermistor R19 and potentiometer R20 form a resistive divider which feeds the base of transistor Q5. Potentiometer R20 establishes the temperature set-point within chamber 11. As the temperature within chamber 11 increases above the set-point, the resistance of NTC thermistor R19 decreases, thereby deactivating Q5 and Q6. Transistor Q6 controls the voltage of pin 1 of NAND gate G1.

However, when the temperature within chamber 11 decreases, the resistance of NTC thermistor R19 increases, thereby turning transistor Q5 and Q6 on, which generates a low voltage at pin 1 of NAND gate G1. When the input voltage of pin 1 of NAND gate G1 is low, the output pin of NAND gate G1 deactivates oscillator 30, thereby deactivating compressor motor M.

Compressor shell temperature circuit 21 and compressor temperature hysteresis circuit 22 also provide control inputs to NAND gate G1. PTC thermistor R2 may be located on the exterior surface of compressor 8 to detect the compressor shell temperature. A resistive divider is formed by PTC thermistor R2 and resistor R23. Transistor Q7 is off under normal temperature conditions keeping R12 oat of the divider network. As the temperature of the compressor increases, the resistance of PTC thermistor R2 also increases, thereby decreasing the voltage present across resistor R23. When the compressor temperature reaches the maximum allowable limit governed by R23 and R2, diode D2 is forward biased and pulls the voltage of input pin 1 of NAND gate G1 low, thereby deactivating compressor motor M.

Additionally, when the output voltage of NAND gate G1 is high, transistor Q7 of temperature hysteresis circuit 22 turns on, introducing resistor R12 in parallel with resistor R23 of the lower element of the resistive divider. By reducing the lower element of the equivalent resistance of the resistive divider of compressor shell temperature circuit 21, transistor Q7 and resistor R12 ensure that the compressor cools to a sufficiently low temperature before a restart attempt may be made.

Circuit 23 provides an over-ride input into NAND gate G1 to control the starting of compressor motor M. Over-ride circuit 23 is only active during motor starting, and includes transistors Q11 and Q12, resistors R11 and R5, and NAND gate G2. Note that the emitter of transistor Q12 is not connected, and transistor Q12 functions as a diode having a characteristic of very low current leakage.

Fan overheat detection circuit 28 is composed of negative temperature coefficient thermistor R49, resistor R50, and NAND gate G7. NTC thermistor R49 may be located in thermal contact with the fan motor of fan 9. As the temperature of the fan motor increases, the resistance of NTC thermistor R49 decreases, thereby increasing the voltage present across resistor R50 and at input pin 2 of NAND gate G7. Therefore, when the fan motor temperature exceeds the limit established by thermistor R49 and resistor R50, fan 9 is disabled through NAND gate G7, NAND gate G6, transistor Q23, resistor R27, and TRIAC2.

Figure 3:
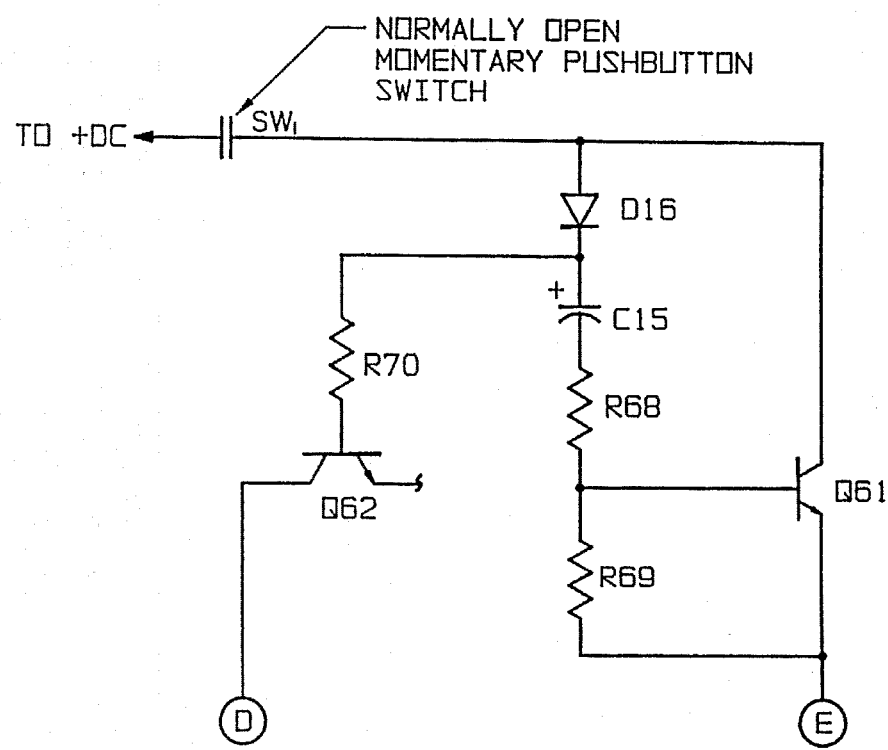
FIG. 3 is a schematic circuit diagram of a manual delay avoidance circuit for the compressor motor protection circuit.

A manually operated delay-avoidance or over-ride circuit is shown in FIG. 3. This circuit allows the user to start the compressor immediately, avoiding waiting until the expiration of the motor protector "off" period. The delay-avoidance circuit of FIG. 3 includes a normally open momentary push-button switch SW1, resistors R68–R70, transistors Q61 and Q62, diode D16, and capacitor C15. When switch SW1 is momentarily closed, capacitor C15 charges, and transistor Q61 turns on. The emitter of Q61 sets the input voltage of NAND gate G2 to a high level, causing the output of gate G2 to drop low, thereby charging capacitor C2 to a high level and allowing the start-up of compressor motor M.

Motor start relay 29 is operative during starting to provide greater start torque than would be provided by run capacitor CR acting alone. Output of gate G1 drops low to initiate compressor starting. In addition to causing compressor motor M energization, the output of G1 causes current to be established in resistor R31 and the emitter base of Q10. This action raises the voltage at input pin 8 of gate G4, thereby causing the output of gate G4 to drop low, turning on TRIAC3. TRIAC3 turns on TRIAC1 via resistor R8 thereby providing a conductive path through the main terminals of TRIAC1. The main terminals of TRIAC1 in turn connect start components capacitor CS and resistor RS across run capacitor CR to provide an enhancement of start torque. The time duration of activation of start TRIAC1 and TRIAC3 is determined by the RC time constant which is the product of the values of capacitor C7 and resistor R33. Resistor R32 forms a discharge path for capacitor C7 upon motor deenergization.

Figure 6:
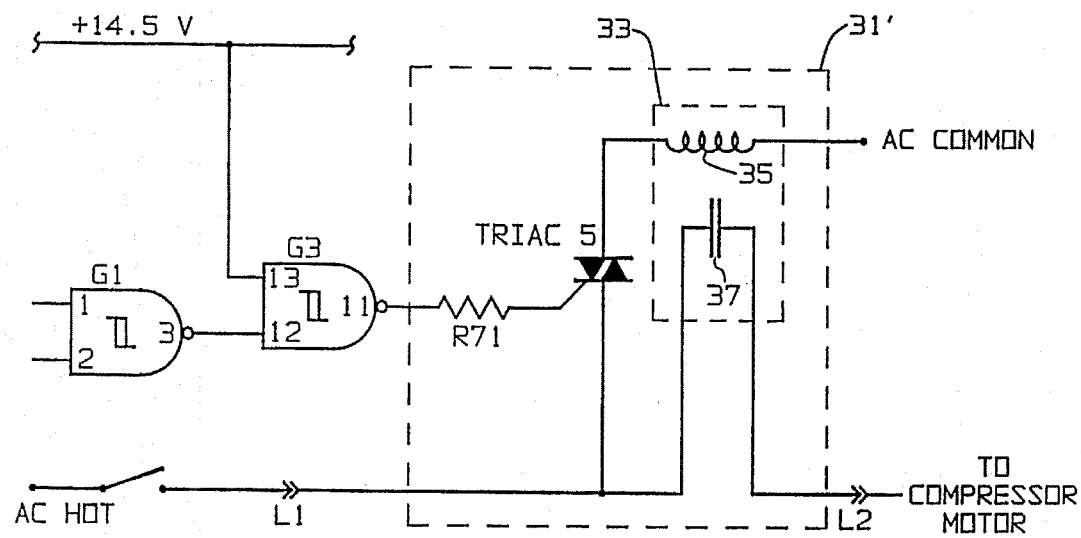
FIG. 6 is a schematic circuit diagram of an alternative embodiment of the output stage.

FIG. 6 shows an alternative embodiment of the compressor motor switching arrangement. Output stage 31' is directly driven by the output of pin 11 of NAND gate G3, and does not require oscillator 30 or any of its related circuitry. The output of gate G3 is connected through resistor R71 to the gate of TRIAC5. TRIAC5 controls the activation of relay 33 comprising coil 35 and contacts 37, and conduction of the DC current from the 14.5 V supply into the gate terminal of TRIAC5 is thus controlled by the output of NAND gate G3. Coil 35 is activated by conduction of TRIAC5 which closes contacts 37 to activate compressor motor M. The embodiment of FIG. 6 provides current isolation between the control circuitry and the power switching circuitry. A suitable relay for output stage 31' is P.&B. KRPA5AG120. Relay 33 may also be a double pole type relay, in which case a contact is connected to each of the two motor terminals. This forms a double break connection, and the relay used for this type connection is commonly called a contactor. Using output stage 31', the circuitry of FIG. 2A would not use transistors Q3, Q8, Q9; resistors R4, R25; capacitors C5, C6; transformer T1; or SCR1 or SCR2. Also, resistor R24 is then connected to the base of transistor Q7.

Fan controller 27 is composed of transistors Q20–Q22, resistors R42–R47, capacitors C10–C11, and NAND gate G5. Fan controller 27 controls the "on" time of the fan via capacitor C10 and resistor R47. The "off" time of the fan is regulated by capacitor C10 and the series combination of resistors R46 and R47. Typically, the "on" time for fan operation is about two minutes, while the "off" time is about eight minutes. Fan 9 is activated by fan activation circuit 32 comprising NAND gate G6, resistors R48 and R27, transistor Q23, and TRIAC2.

The fan timer circuit is adapted to accept commands from a mode selector switch connected at the two terminals of diode D15 to allow fan-on/compressor-off operation, fan-on-timer/compressor-off operation, and fan-on/compressor-on operation. Resistors R45–R47, capacitor C12, and transistor Q22 are configured to monitor both compressor activity and mode selection.

Although the fan control circuitry is disclosed as including a specific arrangement of discrete components, other arrangements may be used, including microprocessor control with preprogrammed software or firmware. The fan control circuitry includes protection circuitry which deactivates both fan 9 and compressor motor M when a fault condition is sensed in fan 9.

The present invention may be practiced by using the following values for the circuit elements described above:

| Label | Value |
| --- | --- |
| R1 | 1 MΩ |
| R2 | PTC Thermistor |
| R3 | 470 KΩ |
| R4 | 33 KΩ |
| R5 | 10 KΩ |
| R6 | 10 MΩ |
| R7 | 150 KΩ |
| R8 | 2.7 KΩ |
| R9 | 270 KΩ |
| R10 | Selected (120 KΩ, for example) |
| R11 | 100 KΩ |
| R12 | 10 KΩ |
| R14 | 1 MΩ |
| R15 | 22 Ω |
| R16 | 33 KΩ |
| R17 | 33 KΩ |
| R18 | 33 KΩ |
| R19 | NTC Thermistor |
| R20 | Potentiometer |
| R23 | 120 KΩ |
| R24 | 270 KΩ |
| R25 | 47 Ω |
| R26 | 50 KΩ |
| R27 | 2.7 KΩ |
| R28 | 2.7 KΩ |
| R29 | 2.7 KΩ |
| R31 | 1 MΩ |
| R32 | 4.7 MΩ |
| R33 | 4.7 MΩ |
| R35 | 820 Ω |
| R41 | 820 Ω |
| R42 | 100 KΩ |
| R43 | 10 KΩ |
| R44 | 100 KΩ |
| R45 | 10 KΩ |
| R46 | 22 MΩ |
| R47 | 10 MΩ |
| R48 | 33 KΩ |
| R49 | NTC Thermistor |
| R50 | 5.1 KΩ |
| R51 | 100 KΩ |
| R52 | 100 KΩ |
| R60 | 3.0 MΩ |
| R61 | 100 KΩ |
| R62 | 24 KΩ |
| R63 | 2.7 KΩ |
| R64 | 33 KΩ |
| R65 | 8.2 KΩ |
| R66 | 820 Ω |
| R67 | 3.9 Ω |
| R68 | 22 KΩ |
| R69 | 22 KΩ |
| R70 | 22 MΩ |
| R71 | 2.7 KΩ |
| RS | 5.0 Ω, 10 Watt |

-continued

| Label | Value |
| --- | --- |
| C2 | 2.2 µf |
| C3 | 15 µf |
| C4 | 2.2 µf |
| C5 | 0.1 µf |
| C6 | 47 pf |
| C7 | 0.1 µf |
| C8 | 0.1 µf |
| C9 | 470 µf |
| C10 | 15 µf |
| C11 | 0.1 µf |
| C12 | 0.1 µf |
| C13 | 0.1 µf |
| C14 | 0.1 µf |
| C15 | 2.2 µf |
| CS | 100 µf |
| CR | 15 µf |
| D1 | 28 V, ½ w Zener |
| D2 | IN4148 |
| D4 | 15 V, 1 w Zener |
| D5 | IN4004 |
| D6 | IN4004 |
| D9 | IN4001 |
| D11 | IN4148 |
| D12 | IN4148 |
| D14 | IN4148 |
| D16 | IN4148 |
| Q3 | 2N3906 |
| Q5 | 2N3906 |
| Q6 | 2N3904 |
| Q7 | 2N3904 |
| Q8 | 2N3904 |
| Q9 | 2N3904 |
| Q10 | 2N3906 |
| Q11 | 2N3906 |
| Q12 | 2N3904 |
| Q20 | 2N3906 |
| Q21 | 2N3904 |
| Q22 | 2N3904 |
| Q23 | 2N3906 |
| Q60 | 2N3904 |
| Q61 | 2N3904 |
| Q62 | 2N3904 |
| G1 | CD4093BE |
| G2 | CD4093BE |
| G3 | CD4093BE |
| G4 | CD4093BE |
| G5 | CE4093BE |
| G6 | CE4093BE |
| G7 | CE4093BE |
| G8 | CE4093BE |
| SCR1 | MCR225-6FP |
| SCR2 | MCR225-6FP |
| TRIAC1 | T2500M |
| TRIAC2 | 2N6073B |
| TRIAC3 | MAC97B |
| TRIAC4 | MAC223-6FP |
| TRIAC5 | 2N6073B |

It should be understood that the signals generated by the circuitry of the present invention may take many forms, such as voltage levels as disclosed, logic levels, polarity, current levels, etc.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A refrigeration system for cooling a chamber, said refrigeration system comprising:

a compressor;

a thermostat disposed in the chamber to be cooled;

a heat exchange apparatus coupled to said compressor and in thermal communication with the chamber to be cooled;

a fan having a motor, said fan disposed in fluid communication with said heat exchange apparatus; and a control circuit coupled to said compressor, said fan, and said thermostat, said control circuit having fan control circuitry selectively activating said compressor and said fan in said response to said thermostat to cool the chamber, said fan control circuitry including a gate and a solid state switch, said solid state switch being responsive to said gate, and said gate being responsive to a second gate, said control circuit also including protection circuitry for sensing a fault condition in said fan, said protection circuitry including said second gate and a thermistor in thermal contact with said fan motor, said second gate being responsive to said thermistor, said protection circuitry deactivating said compressor and said fan when a fault condition is sensed in said fan.

2. The refrigeration system of claim 1 wherein said control circuit includes a fan timer which selectively activates said fan.

3. The refrigeration system of claim 2 wherein said control circuit operates said fan whenever said compressor is operating regardless of said fan timer.

4. The refrigeration system of claim 1 wherein said fan includes a motor, and said protection circuitry further includes a resistance responsive to the temperature of said fan motor, said resistance being coupled to said control circuit for de-activating said compressor when said fan motor temperature exceeds a predetermined level.

5. The refrigeration system of claim 1 wherein said control circuit includes a solid state switch for activating and deactivating said fan.

6. The refrigeration system of claim 1 wherein said control circuit includes a mode selector switch providing for at least three modes of operation, a first mode for operating only said fan, a second mode for operating said fan on timing cycles when said compressor is not operating and running said fan when said compressor is operating, and a third mode for operating said fan continuously, said control circuit utilizing one of said first, second, and third modes according to said mode selector switch.

7. The refrigeration system of claim 1 further comprising a system switch for selectively connecting said compressor to a power supply, wherein said control circuit include motor deactivation circuitry which delays the starting of said compressor for a predetermined time period after said system switch connects said compressor to the power supply subsequent to deactivation of said motor when a fault condition is observed, said control circuit further including a user activated switch connected to over-ride circuitry which immediately initiates operation of said compressor motor in contravention of said motor deactivation circuitry.

8. The refrigeration system of claim 1 wherein said over-ride circuitry only initiates operation of said compressor motor for a predetermined number of attempts, and if said compressor motor does not attain a running condition then said over-ride circuitry locks out operation of said compressor motor for a second predetermined time period.

9. The refrigeration system of claim 7 further comprising start-relay means for decreasing the impedance of circuit elements serially connected with said compressor motor for a predetermined amount of time, whereby decreasing the impedance of said circuit elements increases the torque produced by said compressor motor.

10. The refrigeration system of claim 1 wherein said control circuit includes a solid state switch for electrically coupling said compressor and a power supply.

11. The refrigeration system of claim 10 wherein said control circuit includes an inductive coupling adapted to induce a current on the activation gate of said solid state switch and thereby provide power to said compressor.

12. A refrigeration system for cooling a chamber, said refrigeration system comprising:

a compressor;

a thermostat disposed in the chamber to be cooled;

a heat exchange apparatus coupled to said compressor and in thermal communication with the chamber to be cooled;

a fan having a motor, said fan disposed in fluid communication with said heat exchange apparatus;

a control circuit coupled to said compressor, said fan, and said thermostat, said control circuit selectively activating said compressor and said fan in said response to said thermostat to cool the chamber, said control circuit including protection circuitry for sensing a fault condition in said fan, said protection circuitry deactivating said compressor and said fan when a fault condition is sensed in said fan; and a system switch for selectively connecting said compressor to a power supply, said control circuit includes motor deactivation circuitry which delays the starting of said compressor for a predetermined time period after said system switch connects said compressor to the power supply subsequent to deactivation of said motor when a fault condition is observed, said control circuit further including a user activated switch connected to over-ride circuitry which immediately initiates operation of said compressor motor in contravention of said motor deactivation circuitry.

13. The refrigeration system of claim 12 wherein said over-ride circuitry only initiates operation of said compressor motor for a predetermined number of attempts, and if said compressor motor does not attain a running condition then said over-ride circuitry locks out operation of said compressor motor for a second predetermined time period.

14. The refrigeration system of claim 12 further comprising start-relay means for decreasing the impedance of circuit elements serially connected with said compressor motor for a predetermined amount of time, whereby decreasing the impedance of said circuit elements increases the torque produced by said compressor motor.

* * * * *